United States Patent [19]
Pratt, Jr. et al.

[11] 4,243,120
[45] Jan. 6, 1981

[54] RETRACTABLE BOARDING LADDER

[75] Inventors: Dexter Pratt, Jr., Waukesha; John F. Holz, Milwaukee, both of Wis.

[73] Assignee: Harnischfeger Corporation, W. Milwaukee, Wis.

[21] Appl. No.: 52,800

[22] Filed: Jun. 28, 1979

[51] Int. Cl.$^2$ .................. E06C 1/397; E06C 5/04
[52] U.S. Cl. ............................ 182/98; 182/127
[58] Field of Search .......... 182/98, 97, 85, 88, 182/93, 127; 280/166

[56] References Cited

U.S. PATENT DOCUMENTS

| 2,101,659 | 12/1937 | Vale | 182/85 |
| 2,794,583 | 6/1957 | Ernst | 182/97 |
| 2,860,822 | 11/1958 | Smith | 182/127 |

Primary Examiner—Reinaldo P. Machado
Attorney, Agent, or Firm—James E. Nilles

[57] ABSTRACT

A boarding stairway moves relative to fixed structure in front of it between a raised retracted position and a lowered operative position. Rollers at the top of the stairway are guided in a fixed track that is straight and vertical along most of its length from its top but curves into a short downwardly-rearwardly inclined bottom section. The stringers of the stairway rest against a roller rotatable on a fixed horizontal axis that is below and to the rear of the track; hence the bottom of the stairway swings rearward as it moves down. A counterweight that moves vertically is connected with the stairway by a cable that has a vertical front stretch extending up from the counterweight to a cable guide above the stairway and a rear oblique stretch extending down from the guide to a connection on the stairway that is spaced below its top. As the stairway moves up and down, the inclination of the rear cable stretch so changes that the stairway can be manually started from each position towards the other and moves to the destination position by momentum, coming to a gradual stop at the destination position.

8 Claims, 17 Drawing Figures

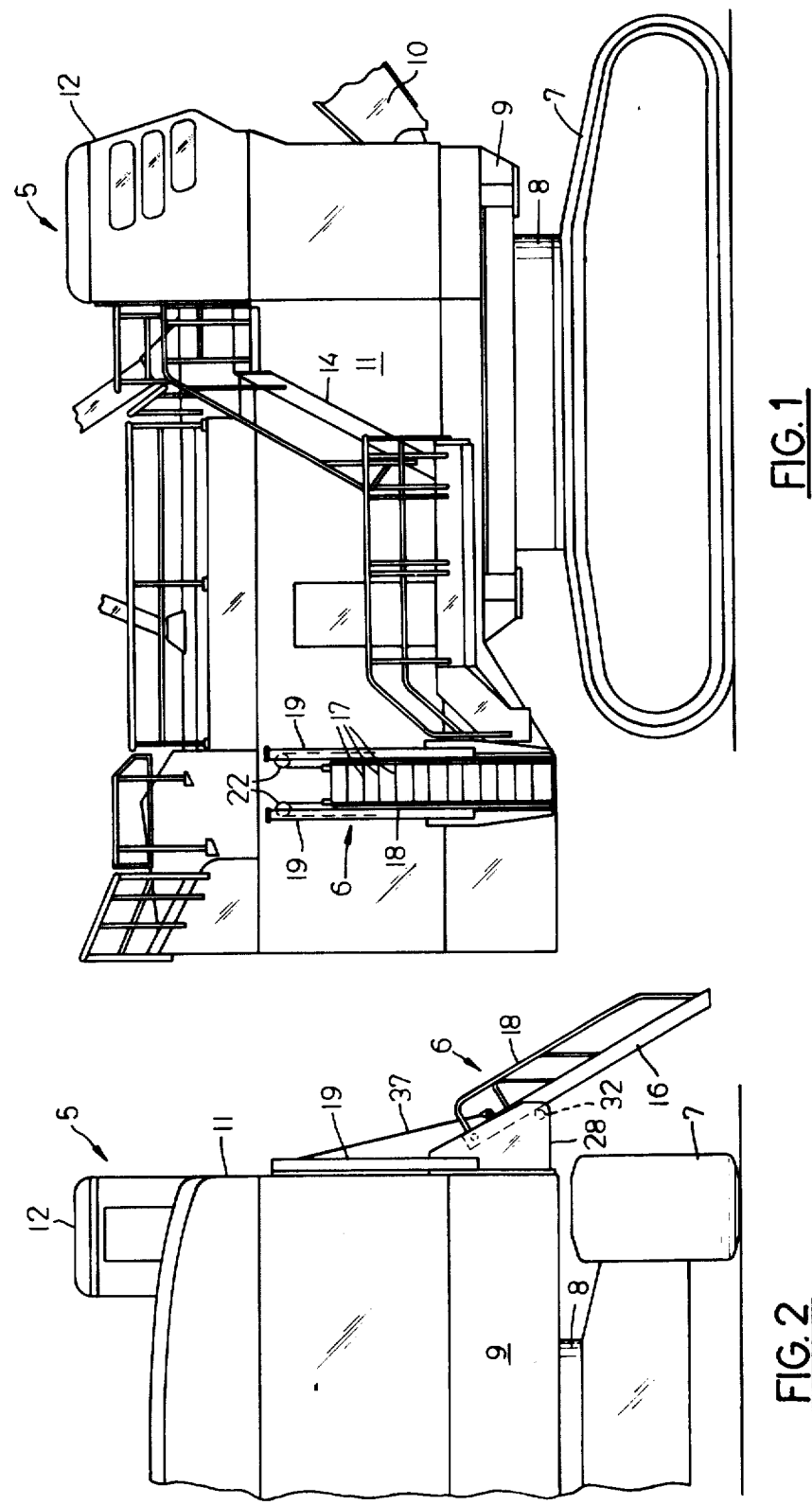

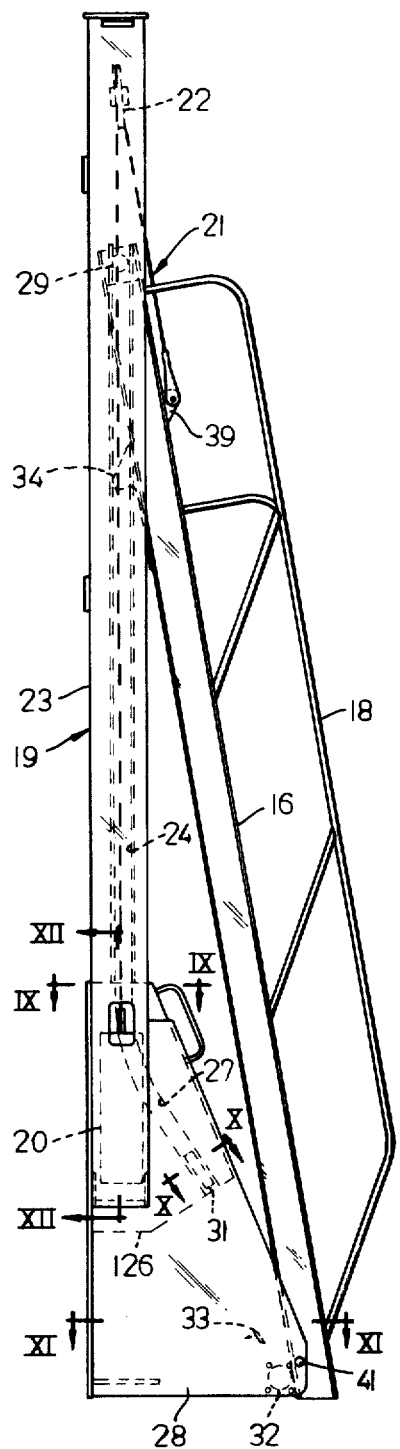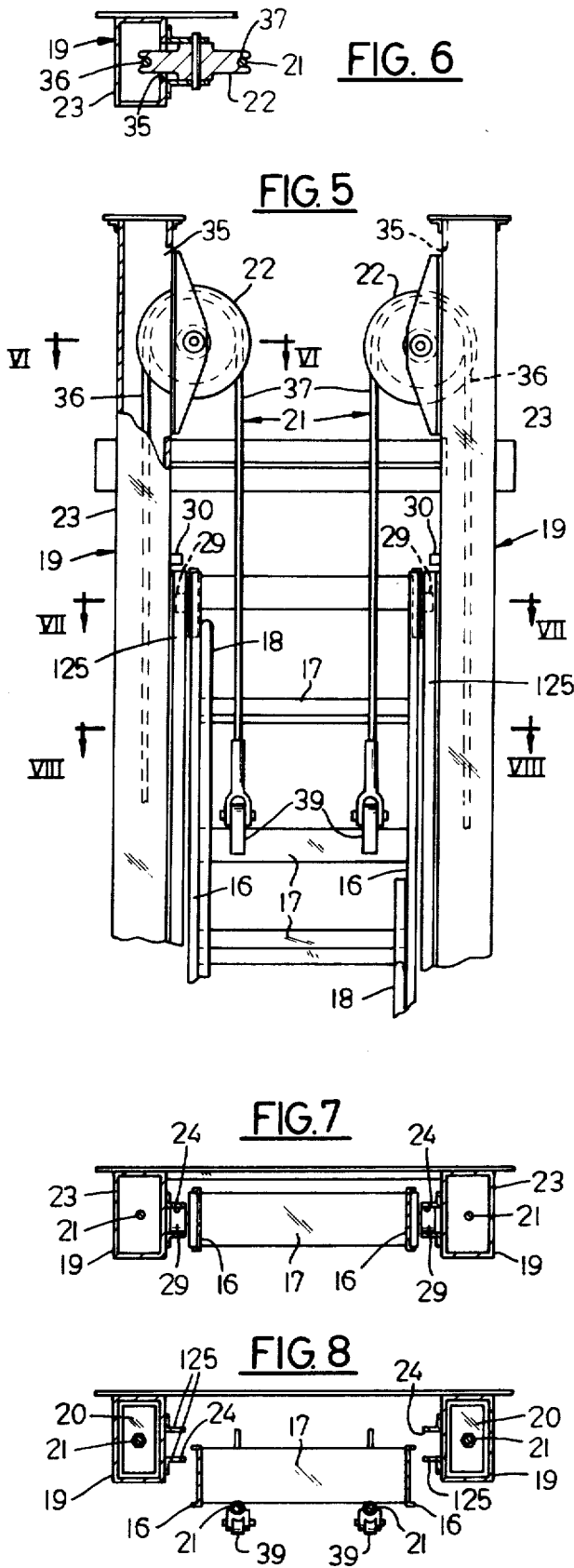

RETRACTABLE BOARDING LADDER

FIELD OF THE INVENTION

This invention relates to a boarding ladder that is movable between a lowered operative position and a raised retracted position; and the invention is more particularly concerned with means by which a retractable ladder that is in the nature of a stairway is connected with fixed structure, is guided for motion between raised and lowered positions, and is so counterbalanced that it can be moved from either of its positions to the other merely by giving it a manual start in the desired direction.

BACKGROUND OF THE INVENTION

Boarding ladders or stairways are typically needed on ships, large land vehicles and mobile machines. One type of installation that poses requirements which are satisfied by the retractable boarding ladder of the present invention is a large crawler-mounted digging machine such as is used in strip mining operations. Such a machine has a revolving platform that is mounted over its crawler treads and carries the upper works of the machine including its digging tool. An operator's cab is mounted at a substantial elevation above the platform. From the level of the platform, access to the cab can be by way of stairways or the like that are fixed on the upper works; but the platform is about 10 or 12 feet above ground level, and access to it should be by way of a ladder or stairway that can be retracted so as not to interfere with swinging of the upper works or with movement of the machine on its crawler treads. As will be evident, the most desirable retracted position for this ladder or stairway is a raised one in which its bottom is at or above the level of the platform and in which no portion of it projects laterally beyond the boundaries of the platform.

There are certain other features which are highly desirable in such a boarding ladder or stairway, but these have heretofore posed problems that have not been easy to solve. As a matter of preference, the boarding device should take the form of a stairway rather than a ladder. Ascent or descent of a ladder requires a person to use one hand to hold onto the ladder in order to maintain his balance, so that it is difficult for him to carry any substantial load of tools or the like, whereas it is relatively easy to carry a heavy load along a stairway that extends at a substantially oblique angle to the vertical, has treads of substantial width, and has suitable guard rails.

In the past, however, where retractability has been essential, a ladder as such has usually been used, rather than a stairway, because it has been accepted that satisfactory retraction and extension could not be achieved with a stairway. A stairway is inherently much heavier than a ladder, and its weight thus poses problems with respect to raising and lowering it. Although power means could be employed for moving it up and down, a power failure would then leave the stairway inaccessible at a time when its availability would be very important.

U.S. Pat. No. 273,386 discloses the use of a manually operated winch for raising and lowering a heavy retractable ladder or stairway, but that expedient is obviously slow and cumbersome.

U.S. Pat. No. 3,737,007 discloses the employment of a counterweight or counterweights to offset the weight of a ladder so that it can be easily raised and lowered. However, the counterweight arrangement shown in that patent, or any other ordinary and obvious counterweight arrangement, would involve significant disadvantages. If the counterweight overbalances the ladder or stairway element, that element will tend to move up out of its extended operative position and to accelerate steadily as it continues to its retracted position, whereas if the retractable element overbalances the counterweight, the ladder or stairway will be hard to raise and will not tend to remain in its raised position but will instead accelerate all the way down to its operative position, where it will be brought to a jolting stop.

The retractable ladder of U.S. Pat. No. 3,737,007 was always raised and lowered from a location at its foot, and it was held in any selected raised position by locking means accessible from below. A boarding ladder for a mining machine or the like must be capable of being both raised and lowered from both above and below, and therefore latching it in either of its positions is not practical.

Of course a stairway, as distinguished from a ladder, presents the further complicating problem that it should undergo a change of orientation as it moves between its retracted and its operative positions. A ladder can move straight up and down between those positions, whereas a retractable stairway should extend at a substantially oblique angle to the vertical when in its lowered operative position, but when retracted it should be as nearly vertical as possible so that it has minimum lateral extension and maximum compactness. Obviously the stairway should not require manual guidance or control for the accomplishment of this change in its orientation.

In some prior boarding stairway installations for mining machines and the like, the stairway could be in its operative position only when the platform of the machine was in designated positions of its swinging motion. Such a limitation is obviously undesirable, as would be any limitation that might be imposed upon swinging of the upper works by the presence of a boarding ladder or stairway in its retracted position.

Before the present invention was made, a great amount of consideration was given to the use of springs for offsetting the weight of a retractable stairway to facilitate manual raising and lowering of it and to provide an arrangement that would satisfy all of the above discussed requirements. However, such proposals involved structural complications or required springs that were so large as to be very expensive and difficult to handle. The powerful springs needed with a stairway had the further important disadvantage that they posed a threat of personal injury in the event of their breakage.

SUMMARY OF THE INVENTION

The general object of this invention is to provide structure that comprises a stairway which is connected with relatively fixed structure for movement relative thereto between a lowered operative position in which the stairway extends at a substantial inclination to the vertical and a raised position in which the stairway is more nearly vertical. The invention provides springless means for so offsetting the substantial weight of the stairway that it can be raised and lowered manually with very little effort but nevertheless tends to remain in each of its raised and lowered positions.

Another important object of this invention is to provide a stairway or retractable ladder of the character described which can be started moving out of each of its raised and lowered positions by an easy manual operation, which then continues to be moved to its destination position by momentum, and which decelerates as it approaches each of its defined positions so as to come to a smooth and gradual stop at the position towards which it has been moved.

Another object of the invention is to provide an extensible and retractable stairway mechanism of the character described that does not require power drive means for moving the stairway from one to the other of its defined positions and does not incorporate any spring, but instead comprises simple counterweight means for so offsetting the weight of the stairway that the stairway can be moved from each of its positions to the other by energy imparted to it in manually starting it moving in the desired direction.

It is also an object of the invention to provide a retractable stairway that is mechanically guided both for bodily movement between its retracted and extended positions and for appropriate change in its orientation as it moves between those positions, and wherein such change in orientation is exploited to afford a very desirable automatic control over acceleration and deceleration of the stairway as it moves from each of its positions to the other.

It is also an object of this invention to provide a retractable boarding stairway which is particularly suitable for a mining machine or the like in that it can be moved between a raised retracted position and a lowered operative position through a vertical distance substantially equal to its length, can be readily moved to either of its positions both from above and from below, and can be retracted and extended with the upper works of the machine in any position of its swinging motion.

In general, the objects of the invention are attained with a ladder that comprises a pair of elongated substantially parallel stringers which extend between top and bottom ends of the ladder and a plurality of transversely extending treads that extend between said stringers at lengthwise spaced intervals along them, in combination with fixed structure in front of the ladder to which the ladder is connected and relative to which it can be raised to a retracted position and lowered to an operative position, the combination being characterized by: first cooperating means on said fixed structure and on the ladder, near its top end, for confining the top of the ladder to up and down motion along a fixed path that is substantially vertical along a substantially major portion of its length; second cooperating means on said fixed structure and on the ladder, spaced below its top end, said second cooperating means being cooperable with said first cooperating means to constrain the bottom of the ladder to swing rearwardly with downward motion of the ladder and forwardly with its upward motion; counterweight means confined to motion in upward and downward directions; cable means having a pair of opposite ends and having one of said ends attached to said counterweight means; securement means connecting the other end of said cable means to the ladder in downwardly spaced relation to its top end so that said securement means partakes of swinging motion of the bottom of the ladder; and cable guide means engaged with the medial portion of said cable means, said cable guide means being at a fixed location on the fixed structure which is above and in front of said securement means when the ladder is in its retracted position so that the stretch of cable means that is between the cable guide means and the securement means extends at increasing angles to the vertical as the ladder approaches each of its said positions.

Preferably said first cooperating means comprises rail means on the fixed structure cooperating with rail-guided means on the top of the ladder, for constraining the top of the ladder to move along said fixed path; said portion along which the path is substantially vertical extends from an upper end of the path to a rearward curvature therein and said curvature in turn continues into a lowermost portion of said path that is substantially straight and is downwardly and rearwardly inclined; and said second cooperating means comprises roller means on said fixed structure engaged by lengthwise extending surfaces on said stringers and rotatable on a fixed axis that is spaced below the bottom end of said track and to the rear of said vertical portion thereof.

BRIEF DESCRIPTION OF DRAWINGS

In the accompanying drawings, which illustrate what is now regarded as a preferred embodiment of the invention:

FIG. 1 is a view in side elevation of a strip mining machine incorporating the boarding ladder or stairway of this invention, which is shown in its raised retracted position;

FIG. 2 is a fragmentary view in end elevation of the machine shown in FIG. 1, with the stairway in its lowered operative position;

FIG. 3 is a view in side elevation of the stairway mechanism with the stairway shown in its raised position;

FIG. 5 is a view in elevation of the upper portion of the mechanism, looking forwardly at the same;

FIG. 6 is a fragmentary sectional view taken on the plane on the line VI—VI in FIG. 5;

FIGS. 7 and 8 are sectional views respectively taken on the planes of the lines VII—VII and VIII—VIII in FIG. 5;

DETAILED DESCRIPTION OF THE INVENTION

Figure 4:
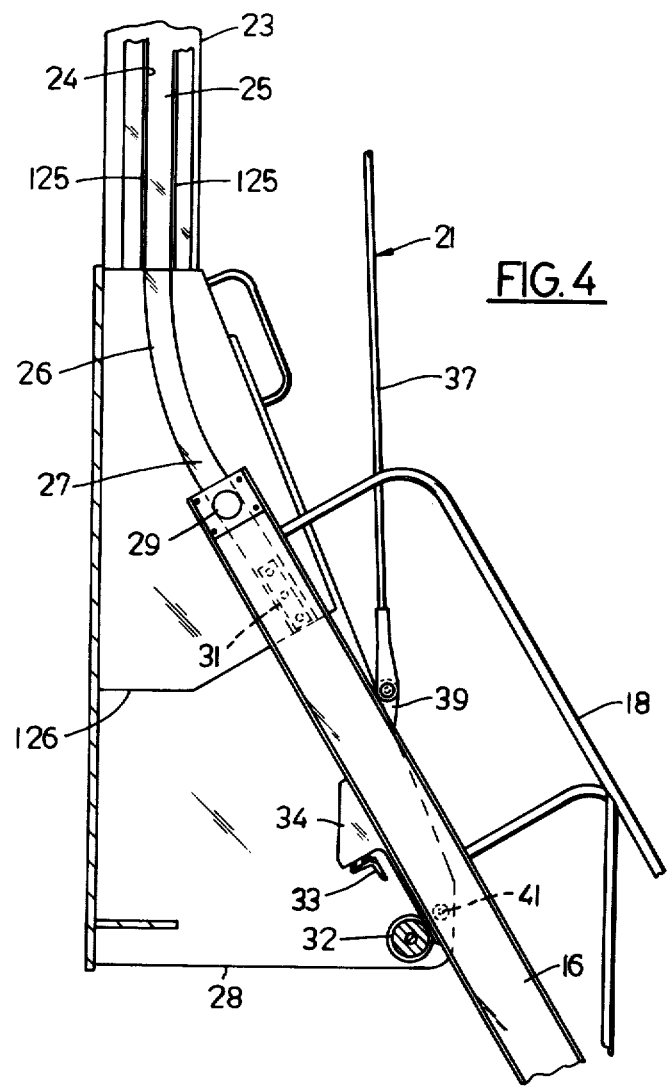
FIG. 4 is a fragmentary view of the upper portion of the stairway in side elevation, as seen in its operative position and with the left rail member removed.
Figure 9:
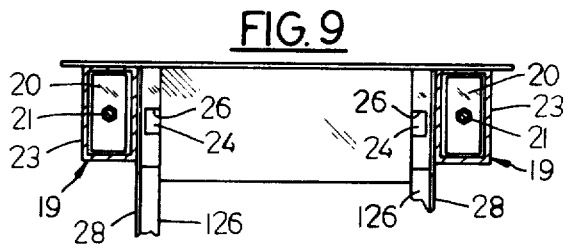
FIGS. 9, 10, 11 and 12 are sectional views respectively taken on the planes of the lines IX—IX, X—X, XI—XI and XII—XII in FIG. 3.
Figure 10:
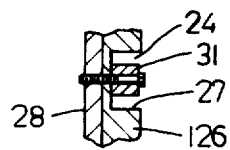

Referring now to the accompanying drawings, the numeral 5 designates generally a large strip mining machine which represents a typical application for a retractable boarding ladder or stairway 6 that embodies the principles of the present invention. The generally conventional lower works of the mining machine 5, which essentially comprises crawler treads 7 and a turntable or skewing ring 8, supports a platform 9 that rotates on the turntable. The platform 9 carries conventional upper works comprising a boom 10 that supports a digging tool (not shown), a housing 11 for machinery that powers the digging tool, and an operator's cab 12 which is mounted on the housing at a substantial height above the level of the platform.

By means of a fixed stairway 14 on the housing 11, an operator can move up and down between the level of the platform 9 and the cab 12, but the bottom of that fixed stairway is at a substantial height above ground level, and the boarding stairway 6 of this invention, when in its lowered operative position, enables personnel to climb to and descend from the platform level.

Considering its form and the manner in which a person can go up and down it, the retractable device 6 is more nearly a stairway than a ladder; but because it is retractable, it can also be regarded as a ladder, and it will usually be so designated herein. When in its lowered operative position the ladder 6 extends from ground level to the bottom of the fixed stairway 14; when retracted, its bottom end is at or slightly above the level of the platform 9.

Figure 17:
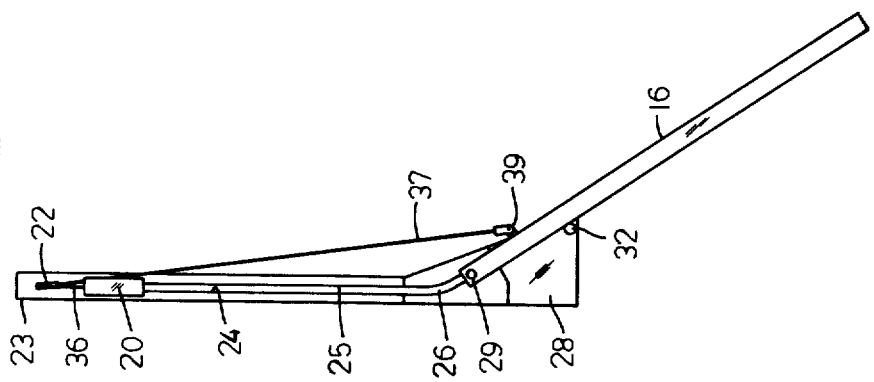
FIGS. 14–17 are more or less diagrammatic side views showing the stairway in four successive positions as it moves from its raised position in which it is shown in FIG. 14 to its lowered position in which it is shown in FIG. 17.

The ladder or stairway 6 comprises a pair of elongated parallel stringers 16 that are bridged at intervals along their lengths by transversely extending flat treads 17. A guard rail 18 is fixed to each of the stringers. When the ladder 6 is in its lowered operative position (see FIGS. 2 and 17) the stringers 16 extend obliquely forwardly and upwardly (typically at an angle of about 60° to the horizontal), and the treads 17 have their surfaces horizontal. In its raised retracted position (see FIGS. 3 and 14) the ladder compactly overlies an upright wall of the housing 11, which can be considered fixed structure that is in front of the ladder. The stringers 16 are more nearly vertical when the ladder is retracted than when it is extended, but even then they are slightly inclined to the vertical (about 10°) for reasons which will appear as the description proceeds.

A pair of guide rail members 19 on the fixed structure provide a connection between the ladder 6 and the fixed structure 11 and comprise a track by which the top end of the ladder is guided in its up and down motion. The guide rail members also afford guidance and enclosure for a pair of counterweights 20 that are connected with the ladder 6 by means of cables or wire ropes 21. Each of the cables 21 has one of its ends connected with a counterweight 20 and its opposite end connected with the ladder, while its medial portion passes over a sheave or cable guide 22 that is at a fixed location above the top of the ladder.

Figure 13:
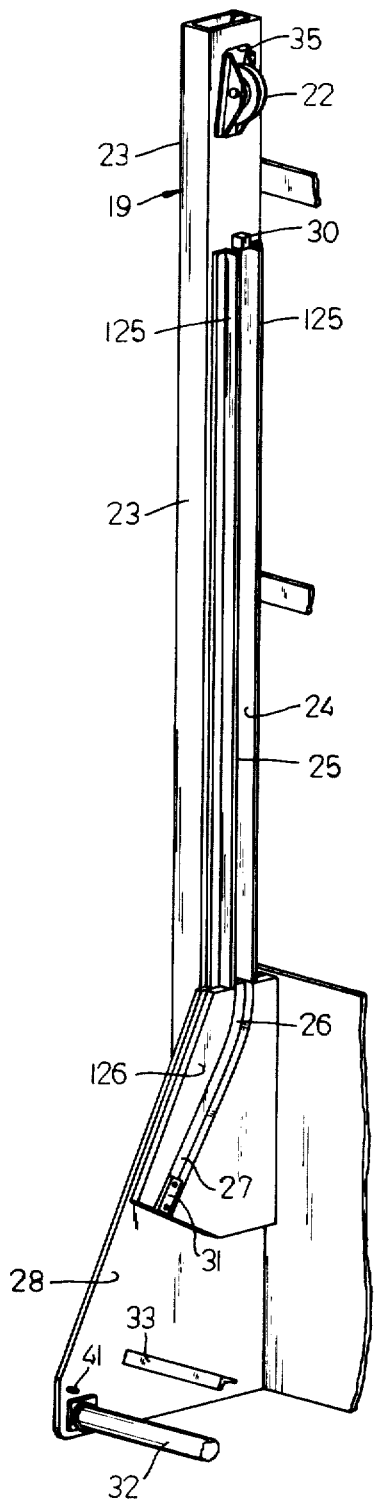
FIG. 13 is a perspective view of one of the track structures for guiding the stairway and counterweight, as seen from the inner side thereof.
Figure 12:
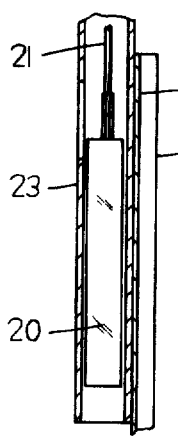

As best seen in FIG. 13, each of the guide rail members 19 comprises a vertically elongated box beam 23 within which a counterweight 20 is slidably guided for its up and down motion. The two box beams 23 are secured to the fixed structure in parallel relation to one another. On each box beam 23, at its side adjacent to the other, there is guide rail structure that defines the path of motion of the top end of the ladder as it moves up and down. Each such guide rail comprises an elongated track groove or channel 24 which opens towards the opposite guide rail member. The track groove 24 is straight and vertical along most of its length from its top, as at 25, but near its bottom it curves rearward, as at 26, into a relatively short straight bottom section 27 that is inclined downwardly and rearwardly. As shown, the long vertical upper section 25 of this groove is defined by a pair of L-section pieces 125, while its lower sections 26 and 27 are defined by a milled slot in a relatively thick plate 126 which in turn flatwise overlies a substantially triangular base plate 28 that projects edgewise rearwardly from the fixed structure 11. Each base plate 28 is of course flatwise secured to its box beam 23.

At its top the ladder has rail-guided means 29 engaged in the grooves 24, comprising a small roller on the laterally outer side of each stringer 16, at its upper end, rotatable on a horizontal axis. The upper and lower limits of roller motion along the track groove 24 are defined by bumpers 30, 31, respectively, on the guide rail members, each closing its end of the groove.

Extending between the triangular base plates 28 is an elongated roller 32 which is engaged by the front or bottom surfaces of the stringers 16 and which rotates on a fixed horizontal axis. It will be apparent that the weight of the ladder maintains the stringers 16 engaged with the long roller 32 and that said roller cooperates with the track grooves 24 and the rail-guided small rollers 29 to guide the ladder in its up and down motion and to control its orientation in every part of such motion.

The long roller 32 is some distance below the lower end of the rail groove 24 and nearly in line with the straight, inclined bottom section 27 of that groove, hence it is spaced to the rear of the straight vertical track section 25. Consequently, the stringers 16 are at the above mentioned slight forward and upward inclination to the vertical when the ladder is in its retracted or fully raised position, and as the ladder moves down from its retracted position, its bottom end swings rearward, more or less in step with downward motion. As the small rollers 29 move around the curve 26 in the track, relative swinging motion of the stringers gradually decreases; and as the rollers 29 move along the short, inclined bottom section 27 of the track, the stringers have an almost purely lengthwise translatory motion. In this lowermost part of ladder motion, and when the ladder is in its fully lowered position, the stringers have their maximum upward and forward inclination to the vertical.

A beam 33 that extends horizontally between the triangular base plates, just above the elongated roller 32, braces those plates against flatwise displacement and also serves as a stop that defines the extended position of the ladder, being engaged in that position of the ladder by forwardly and downwardly projecting hook-like abutments 34 on the stringers 16.

The cables 21 by which the respective counterweights 20 are connected with the ladder 6 pass through openings 35 in the proximal walls of the box beams 23, and each of the cable guide sheaves 22 is mounted in one of those openings for free rotation on a horizontal axis that extends in the front-to-rear direction. Each cable guide 22 defines two stretches of its cable 21, namely a front stretch 36 that extends vertically down to its counterweight 20 and a rear stretch 37 that extends more or less obliquely down to its connection with the ladder.

The tensioning force that each counterweight 20 exerts lengthwise along its cable 21 is nearly constant except for variations that are due to changes in the weight of the front counterweight stretch 36 as it is effectively shortened and lengthened by up and down motion of the counterweight. However, because of the changing angle to the vertical that the rear stretch 37 undergoes as the ladder moves up and down, the vertical components of the forces which the cables impose upon the ladder vary in magnitude as the ladder moves between its operative position and its retracted position. Owing to that variation, the ladder can be manually started in motion out of each of its positions, can be carried by momentum through the rest of the distance to the other position, but decelerates to a relatively gradual stop as it nears that other position.

This very desirable mode of operation results from the location of the connection between each cable 21 and the ladder to take advantage of the changing orientation of the ladder as it moves between its raised and lowered positions. Specifically, the rear stretch 37 of each cable 21 is connected to the ladder at a point that is some distance below the top of the stringers 16 and somewhat to the rear of them. Such connections to the ladder can be made by means of brackets 39 that are secured to the second tread 17 from the top of the ladder (see FIGS. 3–5) and which projects a small distance rearwardly from that tread. Since the brackets 39 are laterally adjacent to the stringers 16, they are not in the way of personnel moving up and down the ladder, and the rear stretches 37 of the cables can extend up parallel to one another from the brackets 34 to the cable guide sheaves 22. In any case, the connections of the cables 21 to the ladder 6 will be at such locations lengthwise of the stringers 16 as to be about midway between the small rail-guided rollers 29 and the long stringer-engaging roller 32 when the ladder is in its lowered position (see FIG. 4).

In all positions of the ladder the rear cable stretches 37 will have at least a small rearward and downward inclination to the vertical, owing to the location of their points of connection to the ladder. However, due to the changing orientation of the ladder as it moves up and down, the rear cable stretches 37 are most nearly vertical when the ladder is about midway between its retracted and extended positions, and they increase their angles to the vertical as the ladder moves towards each of those positions. When those stretches 37 are most nearly vertical, the cables exert a maximum vertically upwrd force upon the ladder, and as they increasingly depart from the vertical, they exert a diminishing vertical component of force but a correspondingly increasing horizontal forward force component.

Through the middle part of the range of motion of the ladder, when the rear cable stretches 37 are most nearly vertical, the vertical upward forces exerted upon the ladder by the cables are nearly in balance with the weight of the ladder. There are small changes in the magnitude of this unbalance as the ladder moves through this middle range, due to changing lengths of the respective cable stretches 36, 37 and the slightly changing angles of the rear cable stretches, but in general the imbalance is small enough so that if the ladder has been started in motion in either direction with a reasonable acceleration, such as can be imparted to it manually, it will continue in motion in that direction due to its own momentum and the momentum of the counterweights.

Figure 15:
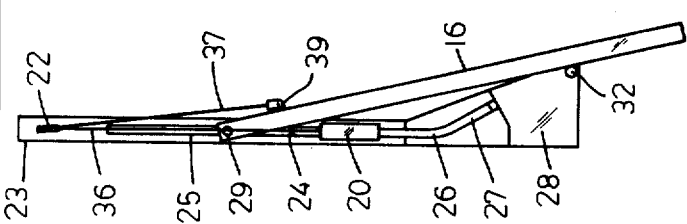
Figure 14:
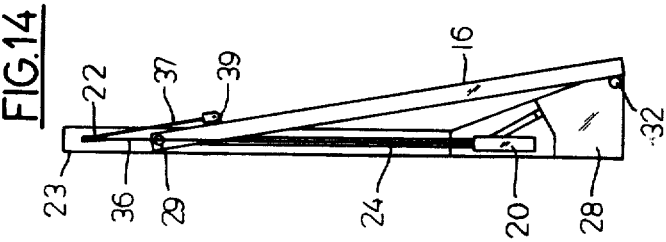

As the ladder nears its retracted position, the rear stretch 37 of each cable assumes a progressively larger angle to the vertical, as can be seen from FIGS. 14 and 15. To some extent the decrease in vertically upward force upon the ladder that results from this change in angle is offset by increasing effective weight of the counterweights as the ladder rises, due to increasing length of the front counterweight stretches 36 of the cables and corresponding decrease in the lengths of the rear stretches 37. At the same time, as the ladder moves up, there is increased friction at the upper rollers 29, due to the increasing horizontal force component exerted by the rear cable stretches 37, and this increase in upper roller friction more than offsets the decrease in friction at the elongated roller 32. As a result of the several forces acting on it, the ladder is decelerated in the final stages of upward motion to its raised position. At the upper limit of its motion, the upward vertical component of force that the counterweights impose upon the ladder may actually be slightly less than sufficient to offset the weight of the ladder, but friction forces will be high enough to retain the ladder in the retracted position until it is intentionally displaced downward.

Figure 16:
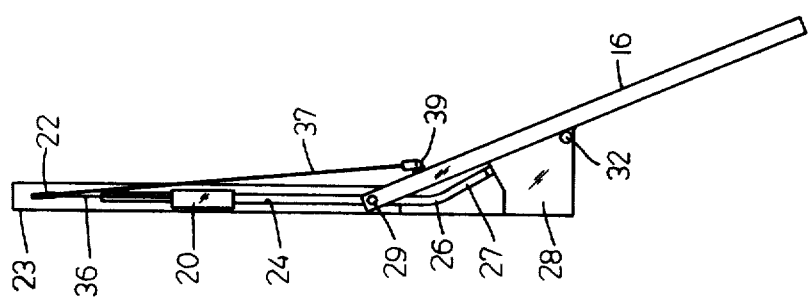

As the ladder moves down from about the middle of its range of motion (compare FIGS. 15 and 16) the rear stretches 37 of the cables gradually increase their inclination to the vertical, due to the rearward swinging of the bottom of the ladder, and consequently the upward component of force which they impose upon the ladder steadily diminishes, so that the ladder effectively overbalances the counterweights to an increasing extent. However, the magnitude of this unbalance is not very large, even at its maximum. If the ladder is moving down, this overbalancing compensates for loss of downward momentum in the ladder and keeps it moving towards its operative position. During retraction, the upward acceleration that has been imparted to the ladder overcomes this imbalance, and the ladder continues to move upward because the imbalance diminishes as the ladder rises.

As the rollers 29 move downward around the curve 26 in the track and into the short inclined track section 27 (compare FIGS. 16 and 17) the rear stretches 37 of the cables continue to increase their inclination to the vertical, but the top end of the ladder now begins to move rearward and the path of motion of the ladder as a whole begins to align itself with the rear cable stretches 37 so that the counterweights become increasingly effective to decelerate the ladder. At the same time, the friction of the several rollers 29, 32 rapidly increases as the center of gravity of the ladder moves farther away from them and exerts greater leverage against them, further slowing the downward movement of the ladder. The ladder is thus brought to a more or less gradual stop at its extended position. With the ladder in that position, the sum of the opposed balancing forces may be such that the ladder would have a tendency to rise out of that position, but it is retained there by friction forces at the rollers 29, 32, which are high enough to resist unintentional displacement but small enough to be readily overcome with reasonable manual effort. As the ladder is started up towards its retracted position, friction forces soon diminish as the rollers 29 move around the curve 26 in the track, but because the change in the direction of bodily motion of the ladder is concurrent with the change in angle of the rear cable stretches 37, the balance of forces on the ladder is such that it continues to move up by momentum.

Because of the geometry of the system, as explained above, the movements of the stairway are so nicely controlled by the counterweights 20 and cables 21 that it has been found advisable, in designing mechanisms embodying the invention, to take into account the changes in effective weight at each side of each cable guide sheave 22 that result from changes in the lengths of the respective cable stretches 36 and 37 as the counterweight and ladder move up and down.

By means of a rope or the like tied to the bottom of the ladder a person on the ground can easily start it down from its retracted position. From the platform 9 it can be pulled up or pushed down by means of the guard rail 18.

Figure 11:
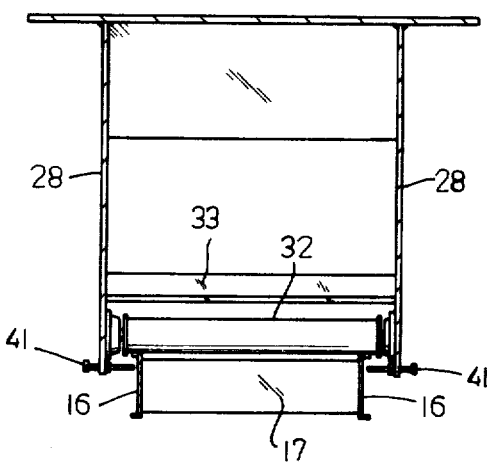

To prevent the ladder from being displaced out of its retracted position during transport of the machine 5, lock bolts 41 (best seen in FIG. 11) can be threaded through the triangular base plates 28 and can be turned in to engage against the opposite sides of the stringers 16.

From the foregoing description taken with the accompanying drawings it will be apparent that this invention provides a retractable boarding ladder in the form of a stairway that can be lowered to an operative position in which it can be ascended and descended like any conventional stairway but can be raised to a retracted position in which it is compactly stored; and it will also be apparent that the retractable ladder of this invention offers important safety features in that it can be manually moved to each of its positions, decelerates during the final stages of movement into each position, and incorporates no springs.

We claim:

1. The combination of a ladder having a pair of elongated substantially parallel stringers that extend between its top and bottom ends and a plurality of transversely extending treads connected between the stringers at lengthwise spaced intervals along them, and means whereby said ladder is connected with relatively fixed structure that is in front of it and is guided and controlled for motion between a raised inoperative position and a lowered operative position, said combination being characterized by:
    A. rail means on said fixed structure cooperating with rail-guided means on the top of the ladder for constraining the top of the ladder to move along a defined path that has upper and lower ends and is straight and substantially vertical along a substantially major portion of its length from its upper end;
    B. guiding means on said fixed structure cooperating with said stringers to impart to the bottom of the ladder a rearward motion component during downward movement of the ladder and a forward component during its upward movement, so that in the operative position of the ladder the stringers are upwardly and forwardly inclined but in its raised position they are more nearly vertical;
    C. counterweight means guided for upward and downward motion along a fixed path;
    D. cable means attached at one end to said counterweight means;
    E. securement means connecting the other end of said cable means to the ladder at a location thereon which is spaced below its upper end and which therefore has a most forwrd position when the ladder is in its raised position, from which position the securement means moves rearward with downward movement of the ladder; and
    F. cable guide means on said fixed structure, engaged with the medial portion of the cable means, said cable guide means being at a fixed location that is above and forward of said most forward position of the securement means, so that forces imposed upon the ladder by the counterweight means, acting through the cable means, are such that the ladder can be moved out of each of its said positions with relatively small force, can be carried by momentum to the position towards which it is started, and decelerates during the final portion of its movement to each of said positions.

2. The combination of claim 1, further characterized by:
    the path defined by said rail means having a downward and rearward curvature continuing into a downwardly and rearwardly inclined lowermost portion so that the ladder has substantially translatory motion lengthwise of said stringers during the final stage of its movement to its operative position.

3. The combination of claim 1 wherein said guiding means comprises roller means rotatable on a fixed horizontal axis that is spaced below the lower end of said rail means and to the rear of said vertical portion thereof.

4. In combination with a ladder that comprises a pair of elongated substantially parallel stringers which extend between top and bottom ends of the ladder and a plurality of transversely extending treads connected between said stringers at lengthwise spaced intervals along them, and fixed structure in front of the ladder to which the ladder is connected and relative to which it is movable between a raised inoperative position and a lowered operative position:
    A. rail means on said fixed structure defining a track that has a substantially straight and vertical section extending a substantial distance down from its top;
    B. guided means on the top of the ladder engaged with said track to constrain the top of the ladder to substantially straight and vertical motion as the ladder moves toward and from its raised position;
    C. guiding means on said fixed structure spaced below said section of the track and cooperating with the stringers to swing the bottom of the ladder rearwardly as the ladder descends and forwardly as the ladder rises;
    D. counterweight means confined to motion in upward and downward directions;
    E. cable means having a pair of opposite ends and having one of said ends attached to said counterweight means;
    F. securement means connecting the other end of said cable means to the ladder in downwardly spaced relation to its top end so that said securement means is in a defined forward location when the ladder is in its raised position and moves rearward as well as downward from that location as the ladder decends; and
    G. cable guide means on said fixed structure, engaged with the medial portion of the cable means, said cable guide means being at a fixed location that is above and forward of said defined location of the securement means, so that the stretch of the cable means that extends from said cable guide means to said securement means is most nearly vertical when the ladder is intermediate its said positions and has increasing inclination to the vertical as the ladder approaches each of its said positions.

5. The combination of claim 4 wherein said guiding means comprises:
    roller means freely rotatable on a fixed horizontal axis that is spaced below and to the rear of said section of said track, said roller means being engaged by each of the stringers along its length.

6. The combination of claim 4 wherein said track defined by said rail means has:
    (1) a downwardly and rearwardly curved section below said straight and vertical section, and
    (2) a shorter straight lowermost section that is downwardly and rearwardly inclined.

7. In combination with a ladder that comprises a pair of elongated substantially parallel stringers which extend between top and bottom ends of the ladder and a plurality of transversely extending treads connected between said stringers at lengthwise spaced intervals along them, and fixed structure in front of the ladder to which the ladder is connected and relative to which it can be raised to a retracted position and lowered to an operative position:
- A. first cooperating means on said fixed structure and on the ladder, near its top end, for confining the top of the ladder to up and down motion along a fixed path that is substantially vertical along a substantially major portion of its length;
- B. second cooperating means on said fixed structure and on the ladder, spaced below its top end, said second cooperating means being cooperable with said first cooperating means to constrain the bottom of the ladder to swing rearwardly with downward motion of the ladder and forwardly with its upward motion;
- C. counterweight means confined to motion in upward and downward directions;
- D. cable means having a pair of opposite ends and having one of said ends attached to said counterweight means;
- E. securement means connecting the other end of said cable means to the ladder in downwardly spaced relation to its top end so that said securement means partakes of swinging motion of the bottom of the ladder and is at a predetermined location when the ladder is in its retracted position; and
- F. cable guide means engaged with the medial portion of said cable means, said cable guide means being at a fixed location on the fixed structure which is above and in front of said predetermined location so that the portion of cable means extending between the cable guide means and the securement means extends at increasing angles to the vertical as the ladder approaches each of its said positions.

8. The combination of a ladder that comprises a pair of elongated substantially parallel stringers which extend between top and bottom ends of the ladder and a plurality of transversely extending treads connected between said stringers at lengthwise spaced intervals along them, fixed structure in front of the ladder to which the ladder is connected and relative to which it is movable between defined raised and lowered positions, counterweight means confined to up and down motion along a vertical path, cable means connected between said counterweight means and said ladder, and cable guide means at a fixed location on said fixed structure and engaged with said cable means to define a front stretch of the cable means that extends vertically down from the cable guide means to the counterweight means and a rear stretch of the cable means that extends from the cable guide means to the ladder, said combination being characterized by:
- A. said rear stretch of the cable means having a connection to the ladder that is in downwardly spaced relation to the top end of the ladder;
- B. the top of the ladder being guided for motion along a path so arranged that as the ladder approaches its raised position said rear stretch of the cable means becomes increasingly inclined to the vertical; and
- C. the bottom of the ladder being guided for motion along a path so arranged that as the ladder approaches its lowered position
  (1) the stringers assume an increasing inclination to the vertical and
  (2) said rear stretch of the cable means becomes increasingly inclined to the vertical, said stretch being most nearly vertical when the ladder is intermediate its said positions.

* * * * *